United States Patent [19]

Greenwood

[11] Patent Number: 4,569,251

[45] Date of Patent: Feb. 11, 1986

[54] DRIVELINE FOR A TRACK-LAYING VEHICLE WITH CONTINUOUSLY VARIABLE STEERING AND PROPULSION TRANSMISSIONS

[75] Inventor: Christopher J. Greenwood, Leyland, United Kingdom

[73] Assignee: Leyland Vehicles Limited, United Kingdom

[21] Appl. No.: 644,803

[22] Filed: Aug. 27, 1984

[30] Foreign Application Priority Data

Aug. 25, 1983 [GB] United Kingdom ............... 8322936

[51] Int. Cl.[4] ................ F16H 37/06; F16H 47/04; F16H 1/42
[52] U.S. Cl. ................... 74/691; 74/720.5; 74/687; 74/714; 180/6.44
[58] Field of Search ............ 74/681, 691, 714, 721, 74/690, 687, 720.5; 180/6.44

[56] References Cited

U.S. PATENT DOCUMENTS

| | | | |
|---|---|---|---|
| 3,545,303 | 12/1970 | Whelahan | 74/720.5 |
| 3,583,256 | 6/1971 | Livezey | 74/687 X |
| 3,938,604 | 2/1976 | Kugler et al. | 74/720.5 X |
| 4,258,585 | 3/1981 | Orshansky, Jr. et al. | 74/687 |
| 4,471,669 | 9/1984 | Seaberg | 74/714 X |
| 4,485,691 | 12/1984 | Reed | 74/714 X |
| 4,497,218 | 2/1985 | Zannberger | 74/714 X |
| 4,519,275 | 5/1985 | Maruyama et al. | 74/714 X |

Primary Examiner—George H. Krizmanich
Assistant Examiner—Dirk Wright
Attorney, Agent, or Firm—Hayes, Davis & Soloway

[57] ABSTRACT

A driveline for a track-laying vehicle such as a tank includes a propulsion transmission (200) and a steer transmission (100), both driven from the engine crankshaft (1), and both of the toroidal race-rolling traction type continuously-variable ratio transmissions. An arrangement of epicyclic gears (12, 13) and clutches (H, C1, C2) transmits drive from the propulsion variator (200) in four regimes to summing epicyclic gears (6, 7) associated with left-hand and right-hand tracks. Steering of the tracks is achieved by summing the drive, in the summing epicyclic gears (6, 7), from the steer variator (100).

7 Claims, 2 Drawing Figures

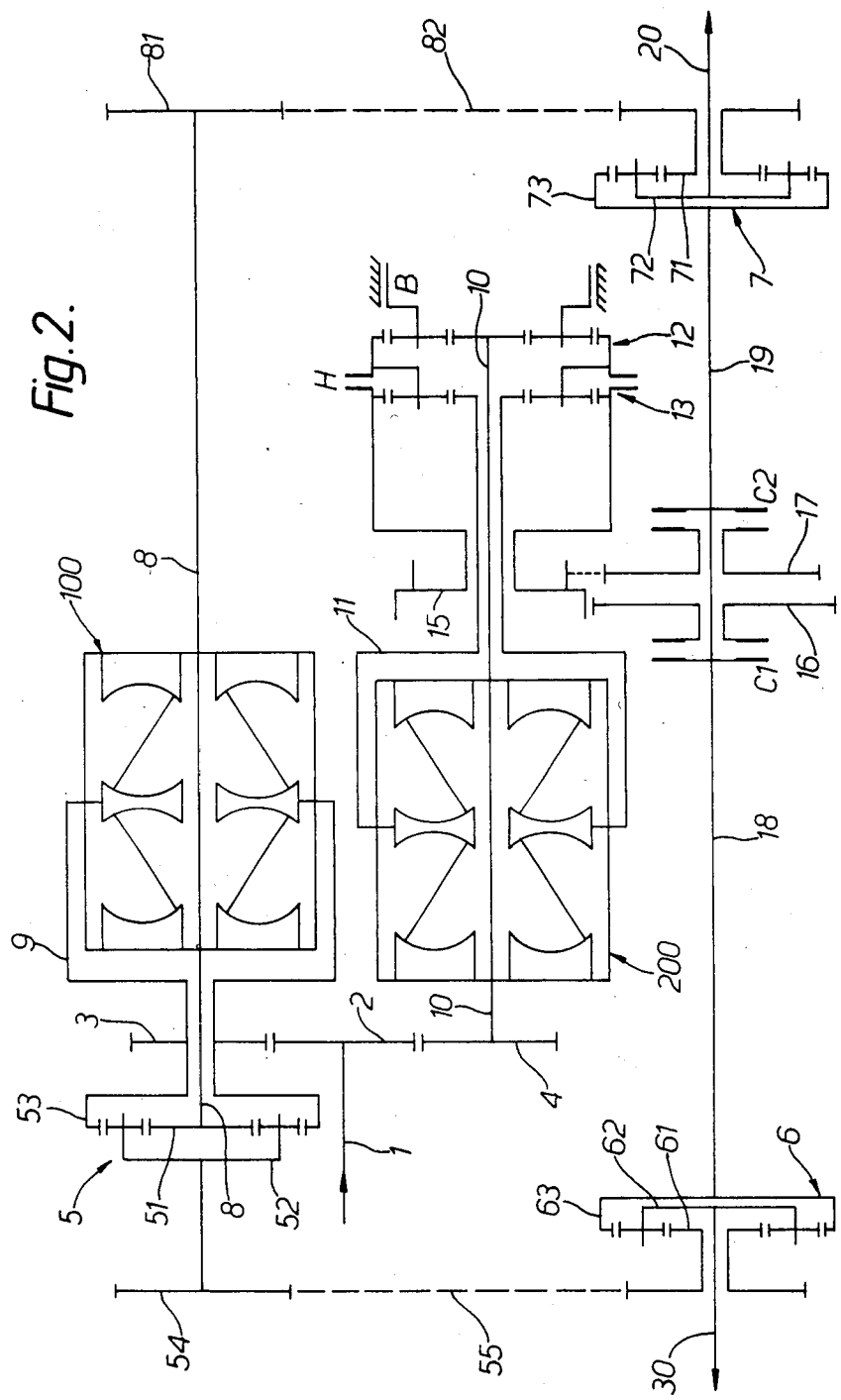

DRIVELINE FOR A TRACK-LAYING VEHICLE WITH CONTINUOUSLY VARIABLE STEERING AND PROPULSION TRANSMISSIONS

This invention relates to a drive line for a track-laying vehicle such as a tank. It is an object of the invention to provide a drive line capable of efficient power transfer between left-hand and right-hand track drive shafts, and stepless gear ratio changes for steering.

The invention consists in a driveline for a track-laying vehicle, comprising first and second track drive shafts, a drive transmission adapted to be driven by the vehicle engine, first and second summing epicyclic gears each with a first input driven by the said drive transmission and an output driving a respective track drive shaft, a continuously-variable ratio steering transmission with an input adapted to be driven by the engine, and a third summing epicyclic gear having a first input adapted to be driven by the engine, a second input connected to an output of the continuously-variable ratio steering transmission, and an output driving a second input to the first summing epicyclic gear via suitable gearing, the said output of the continuously-variable ratio steering transmission also driving a second input to the second summing epicyclic gear.

Moreover, the preferred driveline includes a cross-shaft driven by the drive transmission and common to both first inputs of the first and second summing epicyclic gears. The first, second and third summing epicyclic gears are advantageously simple epicyclic gears.

In order that the invention may be better understood, the drive line for a tank will now be described, with reference to the accompanying drawings, of which:

FIG. 2 is a diagram of a driveline in accordance with the preferred embodiment, the driveline including a steering and a drive transmission each continuously-variable and of the toroidal race-rolling traction type.

Figure 1:
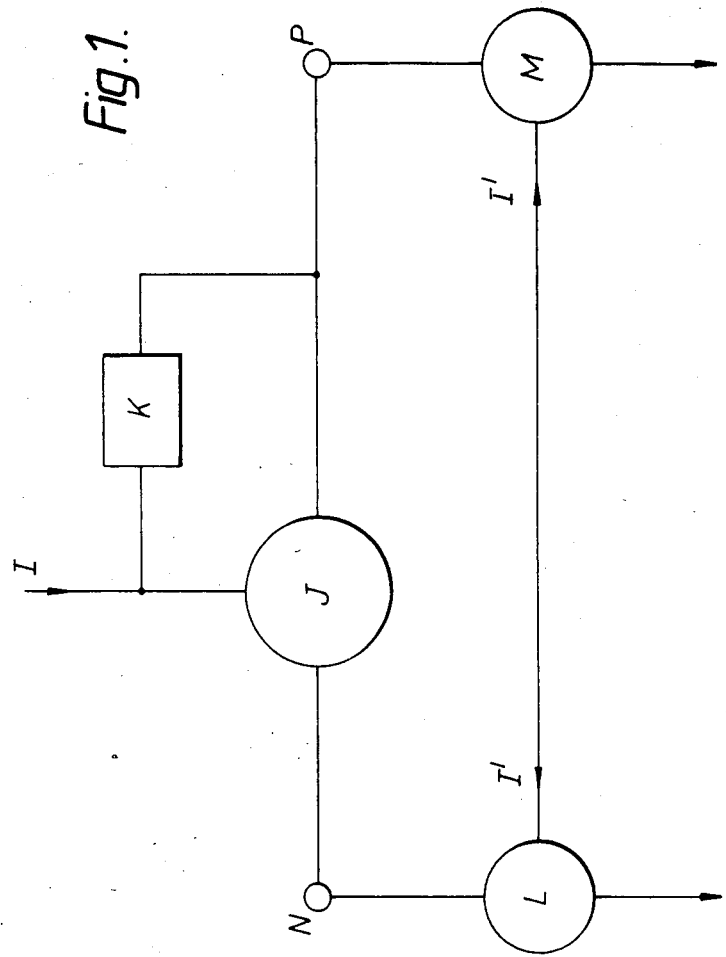
FIG. 1 is a schematic diagram of the driveline embodying the invention.

Referring first to FIG. 1, drive I from the engine of a tank is geared to the inputs both of a continuously-variable ratio steering transmission K and a summing epicyclic gear J. The engine also supplies drive I' to summing epicyclic gears L, M which output drive to respective track drive shafts. One output of the gear J is geared (N) at a suitable ratio to a further input of the summing epicyclic gear L, while another output of gear J is coupled to the output of the steering transmission K which drives, through suitable gearing P, a further input of the summing epicyclic gear M.

For straight drive, that is without a steering bias, the steering transmission K is set so that the inputs from respective gearing N, P to the two epicyclic gears L, M are equal. A steering bias is effected by changing the ratio of the steering transmission K in either direction. The continuously-variable ratio transmission K is preferably designed, together with the ratios at N, P and J, to have an equal range of ratios at either side of the neutral steering point.

Referring now to FIG. 2, which shows one example of the driveline of FIG. 1, drive from the crankshaft 1 of the engine of a tank is geared both to a steer variator 100 and to a propulsion variator 200. In this example, both transmissions 100, 200 are the toroidal race-rolling traction type continuously-variable ratio transmission. Drive from the propulsion variator 200 reaches the left-hand and right-hand track drive shafts 20, 30, by way of various epicyclic gears and clutches described in detail in British Patent Application No. 8322937. Drive from the steer variator 100 is coupled to the propulsion drive by simple epicyclic gears 6, 7, which steers the tank by altering the relative speeds of the tracks.

Drive from the engine crankshaft 1 reaches the input shaft 10 of the propulsion variator 200 by gearings 2, 4. Drive from the input shaft 10 or the output shaft 11 of the propulsion variator 200 passes through an arrangement of epicyclic gears 12, 13, and clutches H, C1 or C2, to a cross-shaft of which portions 18, 19 are connected respectively to the annuli 63, 73, of simple epicyclic gears 6, 7. The planet carrier 62, 72, of each simple epicyclic gear 6, 7, provides a propulsion drive output to the respective drive shaft 30, 20.

The steer variator 100 receives its drive input from the engine crankshaft 1 by way of gearings 2, 3. Gearing 3 is coupled to the input shaft of the steer variator and also to the annulus 53 of a simple epicyclic gear 5. The output shaft 8 of the steer variator is connected at one end through gearing 81, 82, to the sun gear 71 of the simple epicyclic gear 7 which supplies drive to drive shaft 20. The other end of constant speed shaft 8 of the steer variator is connected to the sun gear 51 of the simple epicyclic gear 5, of which the planet carrier 52 is connected to drive the sun gear 61 of simple epicyclic gear 6 by way of gearing 54, 55. The simple epicyclic gear 5 causes the gears 54 and 81 to rotate in opposite rotational senses. The change of ratio introduced by the simple epicyclic gear 5 is compensated for by suitably selecting the ratio of gearing 55 and 82; in this example, gearing 55 provides a ratio of −2.86 (i.e. it reverses the rotational sense) and gearing 82 a ratio of 1.0.

Simple epicyclic gear 6 effectively sums the drive from the cross shaft (at 18) and from the steer variator via gearing 54, 55, to provide a steered output on drive shaft 30. Similarly, simple epicyclic gear 7 sums the drive from the cross shaft (at 19) and gearing 81, 82, to provide a steered output on drive shaft 20.

I claim:

1. A driveline for a track-laying vehicle, comprising first and second track drive shafts, a drive transmission adapted to be driven by the vehicle engine, first and second summing epicyclic gears each with a first input driven by the said drive transmission and an output driving a respective track drive shaft, a continuously-variable ratio steering transmission with an input adapted to be driven by the engine, and a third summing epicyclic gear having a first input adapted to be driven by the engine, a second input connected to an output of the continuously-variable ratio steering transmission, and an output driving a second input to the first summing epicyclic gear via suitable gearing, the said output of the continuously-variable ratio steering transmission also driving a second input to the second summing epicyclic gear.

2. A driveline in accordance with claim 1, wherein the continuously-variable ratio steering transmission is of the toroidal race-rolling traction type.

3. A driveline in accordance with claim 1, wherein the first input of each of the first and second summing epicyclic gears is driven by the drive transmission by way of a cross shaft common to both gears.

4. A driveline in accordance with claim 3, wherein the first and second summing epicyclic gears are simple epicyclic gears of which the annulus and sun are inputs and the planet carrier is the output.

5. A driveline in accordance with claim 1, wherein the third summing epicyclic gear is a simple epicyclic gear, of which the annulus is the said first input and is integral with an input shaft of the continuously-variable ratio steering transmission, the sun gear is connected to the output shaft of the steering transmission, and the planet carrier is the output.

6. A driveline in accordance with claim 1 wherein the output of the third summing epicyclic gear rotates in the opposite sense to the output of the continuously-variable ratio steering transmission but the said suitable gearing reverses the rotational sense of the drive so that the said second inputs to the first and second summing epicyclic gears rotate in the same rotational sense.

7. A driveline in accordance with claim 3, wherein the drive transmission is a continuously-variable ratio transmission of the toroidal race-rolling traction type, driving the cross shaft by way of a system of transfer gears and/or clutches.

* * * * *